United States Patent
Jeon et al.

(10) Patent No.: US 11,815,941 B2
(45) Date of Patent: Nov. 14, 2023

(54) PERIPHERAL COMPONENT INTERCONNECT EXPRESS DEVICE AND OPERATING METHOD THEREOF

(71) Applicant: SK hynix Inc., Icheon-si (KR)

(72) Inventors: Yong Tae Jeon, Icheon-si (KR); Dae Sik Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/526,995

(22) Filed: Nov. 15, 2021

(65) Prior Publication Data
US 2022/0382705 A1 Dec. 1, 2022

(30) Foreign Application Priority Data
May 26, 2021 (KR) .................. 10-2021-0067690

(51) Int. Cl.
 *G06F 13/42* (2006.01)
 *G06F 13/40* (2006.01)
(52) U.S. Cl.
 CPC ...... *G06F 13/4221* (2013.01); *G06F 13/4027* (2013.01); *G06F 2213/0026* (2013.01)
(58) Field of Classification Search
 CPC ............. G06F 13/4221; G06F 13/4027; G06F 2213/0026
 See application file for complete search history.

(56) References Cited

U.S. PATENT DOCUMENTS

| | | | |
|---|---|---|---|
| 7,191,255 B2 | 3/2007 | Wong et al. | |
| 10,366,044 B2 | 7/2019 | Choi | |
| 10,503,679 B2 * | 12/2019 | Huang | H04L 67/1097 |
| 10,713,209 B2 | 7/2020 | Jen | |
| 2006/0090014 A1 * | 4/2006 | Wong | G06F 13/423 710/10 |
| 2012/0166699 A1 * | 6/2012 | Kumar | G06F 13/385 710/305 |
| 2014/0189427 A1 | 7/2014 | Jayaprakash Bharadwaj et al. | |
| 2015/0370683 A1 | 12/2015 | Nishiyama et al. | |
| 2016/0267048 A1 | 9/2016 | Pethe et al. | |

(Continued)

FOREIGN PATENT DOCUMENTS

| | | |
|---|---|---|
| KR | 10-1565357 B2 | 9/2014 |
| KR | 10-2018-0037783 A | 4/2018 |

(Continued)

OTHER PUBLICATIONS

Non-Final Rejection of U.S. Appl. No. 17/527,032 from USPTO dated Feb. 8, 2023.

(Continued)

*Primary Examiner* — Nimesh G Patel

(57) ABSTRACT

A method of operating a Peripheral Component Interconnect Express (PCIe) device including a first port and a second port comprises: performing a first link training operation to link up a first host with a first link of the first port; operating in a single port mode when the first link training operation is completed; performing a lane reduce operation to reduce a lane corresponding to the first link in response to a mode change request received from the first host; and performing a second link training operation to link up a second host with a second link of the second port when a status of the first link is an L0 state.

23 Claims, 13 Drawing Sheets

(56) References Cited

U.S. PATENT DOCUMENTS

| | | | |
|---|---|---|---|
| 2017/0357609 A1* | 12/2017 | Long | G06F 13/4282 |
| 2019/0303342 A1 | 10/2019 | Jen et al. | |
| 2020/0226084 A1 | 7/2020 | Das Sharma | |
| 2020/0349064 A1* | 11/2020 | Lim | G06F 12/0238 |
| 2021/0073157 A1* | 3/2021 | Olarig | G06F 13/4068 |
| 2021/0318815 A1* | 10/2021 | Olarig | G06F 1/26 |

FOREIGN PATENT DOCUMENTS

| | | |
|---|---|---|
| KR | 10-2018-0095765 A | 8/2018 |
| KR | 10-2020-0010139 A | 1/2020 |

OTHER PUBLICATIONS

"PCI Express® Base Specification Revision 4.0 Version 1.0", Sep. 27, 2017.

"PCI Express® Base Specification Revision 5.0 Version 1.0", May 22, 2019.

\* cited by examiner

PERIPHERAL COMPONENT INTERCONNECT EXPRESS DEVICE AND OPERATING METHOD THEREOF

CROSS-REFERENCE TO RELATED APPLICATION

The present application claims priority under 35 U.S.C. § 119(a) to Korean patent application number 10-2021-0067690, filed on May 26, 2021, in the Korean Intellectual Property Office, the entire disclosure of which is incorporated herein by reference.

BACKGROUND

1. Technical Field

Various embodiments generally relate to an electronic device, and more particularly, to a Peripheral Component Interconnect Express (PCIe) device and an operating method thereof.

2. Related Art

Peripheral Component Interconnect Express (PCIe) refers to an interface with a serial configuration for data communication. A PCIe-based storage device may support multi-port and multi-function. A PCIe-based storage device may be virtualized or non-virtualized and achieve Quality of Service (QoS) of host I/O commands through at least one PCIe function.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a method of operating an improved PCIe device by changing a port mode.

According to an embodiment, a Peripheral Component Interconnect Express (PCIe) device may include a first port linking up with a first host using a first link, a second port linking up with the first host or a second host using a second link, and a port mode controller controlling the first port and the second port to change an operating mode from a dual port mode, in which the first port and the second port operate independently of each other, to a single port mode in which only the first port operates, wherein the port mode controller controls the second port to reset the second link in a state where the first link is linked up.

According to an embodiment, a Peripheral Component Interconnect Express (PCIe) device may include a first port linking up with a first host using a first link, a second port linking up with the first host or a second host using a second link, and a port mode controller controlling the first port and the second port to change an operating mode from a single port mode, in which only the first port operates, to a dual port mode in which the first port and the second port operate independently of each other, wherein the port mode controller controls the second port to perform a link training operation to link up the second link in a state where the first link is linked up.

According to an embodiment, a method of operating a Peripheral Component Interconnect Express (PCIe) device including a first port and a second port may include performing a first link training operation to link up a first host with a first link of the first port, operating in a single port mode when the first link training operation is completed, performing a lane reduce operation to reduce a lane corresponding to the first link in response to a mode change request received from the first host, and performing a second link training operation to link up a second host with a second link of the second port when a status of the first link is an L0 state.

According to an embodiment, a method of operating a Peripheral Component Interconnect Express (PCIe) device including a first port and a second port may include performing a first link training operation to link up a first host with a first link of the first port and a second link training operation to link up a second host with a second link of the second port, operating in a dual port mode, in which the first link and the second link operate independently of each other, when the first link training operation and the second link training operation are completed, deactivating the second link in response to a mode change request received from the first host or the second host, and performing a lane increase operation to increase a lane corresponding to the first link when the deactivation of the second link is completed.

DETAILED DESCRIPTION

Figure 1:
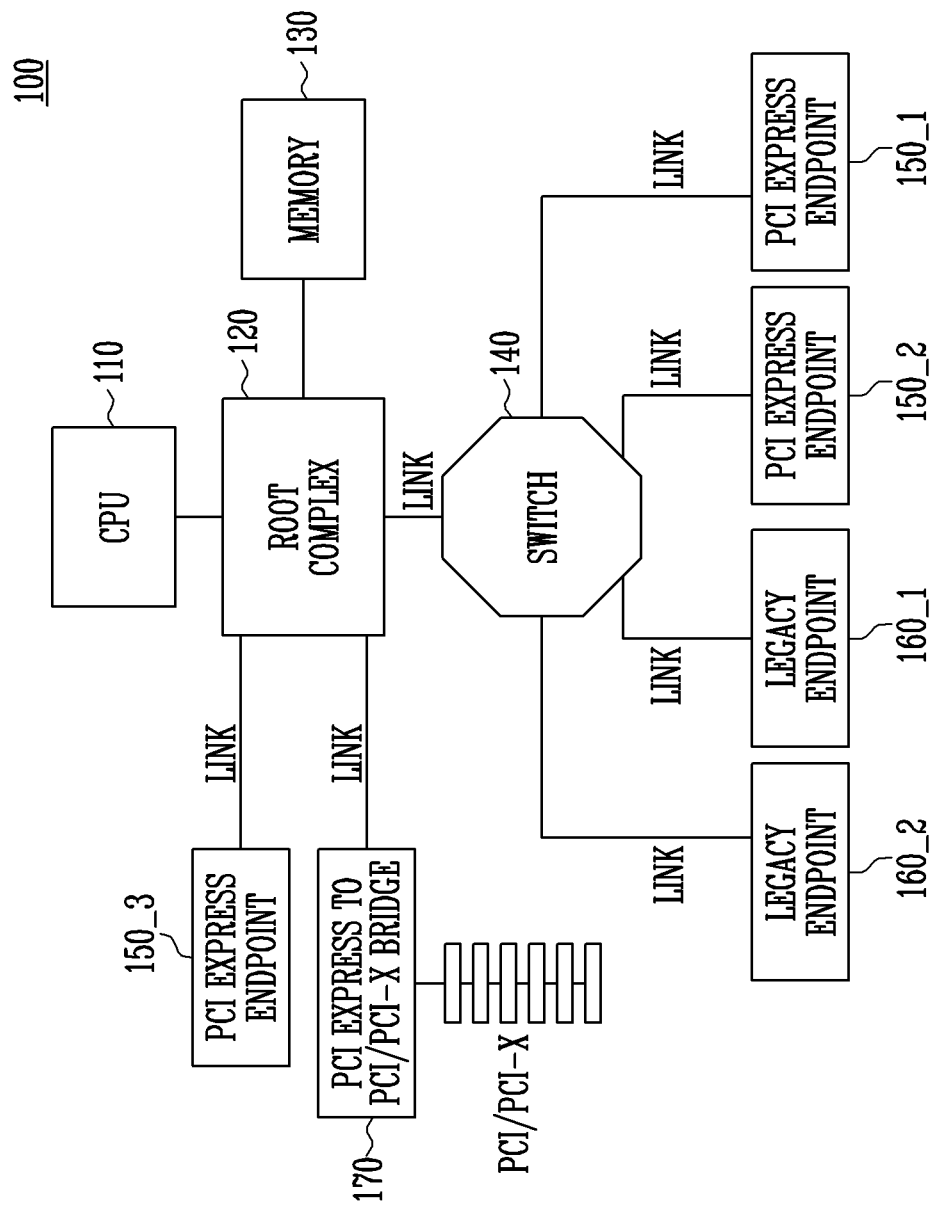
FIG. 1 is a diagram illustrating a PCIe computing system according to an embodiment of the present disclosure.

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms, however, and the descriptions are not limited to the examples of embodiments described in this specification.

Various modifications and changes may be applied to the examples of embodiments in accordance with the concepts so that the examples of embodiments will be illustrated in the drawings and described in the specification. However, the embodiments according to the concept of the present disclosure are not construed as limited to specified disclosures, and include all changes, equivalents, or substitutes that do not depart from the spirit and technical scope of the present disclosure. In describing those embodiments, description will be omitted for techniques that are well known to the art to which the present disclosure pertains, and are not directly related to the present disclosure. This intends to disclose the gist of the present disclosure more clearly by omitting unnecessary description.

Hereinafter, exemplary embodiments of the present disclosure will be described in detail with reference to the accompanying drawings.

FIG. 1 is a diagram illustrating a PCIe computing system according to an embodiment of the present disclosure.

Referring to FIG. 1, the PCIe computing system 100 may include a central processing unit (CPU) 110, a root complex 120, a memory 130, a switch 140, PCIe endpoints 150_1 to 150_3, legacy endpoints 160_1 and 160_2, and a PCIe to PCI/PCI-X bridge 170.

The PCIe computing system 100 may be an electronic device that supports communication using a PCIe interface. The PCIe computing system 100 may be a personal computer (PC), a laptop computer, or a mobile computing device. The PCIe computing system 100 may include an expansion card, an expansion board, an adapter card, an add-in card, or an accessory card. In addition, the PCIe computing system 100 may include a printed circuit board (PCB) that is inserted into an electrical connector or an expansion slot on a mother board of the PCIe computing system 100 to provide additional functions to the PCIe computing system 100 through an expansion bus. In addition, the PCIe computing system 100 may include a storage device, such as solid state drive (SSD), and may include a graphic card, a network card, or a USB card.

The CPU 110 may be electrically coupled to each of the components of the PCIe computing system 100 and may control respective operations of the PCIe computing system 100. More specifically, the CPU 110 may drive an operating system or an application program to control components of hardware or software coupled to the CPU 110 and may perform various types of data processing and operations. In addition, the CPU 110 may perform software or applications for controlling the operations of the PCIe computing system 100.

The root complex 120 may be a root hub, a controller hub, or a root controller in a PCIe interconnection architecture. For example, the root complex 120 may include a chipset, a memory controller hub (MCH), a northbridge, an interconnect controller hub (ICH), a southbrdige, and a root controller/hub. In addition, the root complex 120 may connect the CPU 110 and the memory 130 to an I/O hierarchy. The root complex 120 may support peer-to-peer (P2P) routing. The root complex 120 may include at least one host bridge and root port. The root complex 120 may support at least one PCIe port.

The memory 130 may store data, commands or program codes necessary for operations of the PCIe computing system 100. According to an embodiment, the memory 130 may store program codes that are operable to execute one or more operating systems (OS) and virtual machines (VM), and program codes that execute a virtualization intermediary (VI) for managing the virtual machines (VM). In addition, the memory 130 may be realized as a volatile memory device such as DRAM or SRAM.

The switch 140 may route packets or messages upstream or downstream. More specifically, the switch 140 may route packets or messages up a hierarchy toward the root complex 120 from a PCIe endpoint (e.g., 150_1). Alternatively, however, the switch 140 may route packets or messages down a hierarchy away from the root complex 120 toward a PCIe endpoint (e.g., 150_2).

The switch 140 may be referred to as a logic assembly of a plurality of virtual PCI-to-PCI bridge devices. Examples of devices that are connected to the switch 140 may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

Each of the PCIe endpoints 150_1 to 150_3 and the legacy endpoints 160_1 and 160_2 may serve as a requester or a completer of a PCIe transaction. Transaction layer packets (TLPs), which are transmitted or received by the PCIe endpoints 150_1 to 150_3 and the legacy endpoints 160_1 and 160_2 may provide configuration space headers. In addition, each of the PCIe endpoints 150_1 to 150_3 and the legacy endpoints 160_1 and 160_2 may provide a configuration request as a completer. Under specific conditions, transaction layer packets (TLPs) that are transmitted or received by the PCIe endpoints 150_1 to 150_3 and the legacy endpoints 160_1 and 160_2 must provide configuration space headers. In addition, each of the PCIe endpoints 150_1 to 150_3 and the legacy endpoints 160_1 and 160_2 must provide a configuration request as a completer.

The PCIe endpoints 150_1 to 150_3 and the legacy endpoints 160_1 and 160_2 may be classified depending on the possible size of the memory transaction. For example, when a memory transaction exceeding 4 GB is possible, an endpoint may be a PCIe end point (150_1 to 150_3). On the other hand, when a memory transaction exceeding 4 GB is impossible, an endpoint may be a legacy endpoint (160_1 and 160_2). While the PCIe endpoints 150_1 to 150_3 are not permitted to generate I/O requests, the legacy endpoints 160_1 and 160_2 may provide or generate I/O requests. In addition, the PCIe endpoint 150_3 may transmit or receive the TLPs to or from the root complex 120. Furthermore, PCI/PCI-X may transmit or receive the TLPs to or from the root complex 120 through the PCIe to PCI/PCI-X bridge 170. In addition, the PCIe endpoints 150_1 and 150_2 and the legacy endpoints 160_1 and 160_2 may transmit or receive the TLPs to or from the switch 140.

Figure 2:
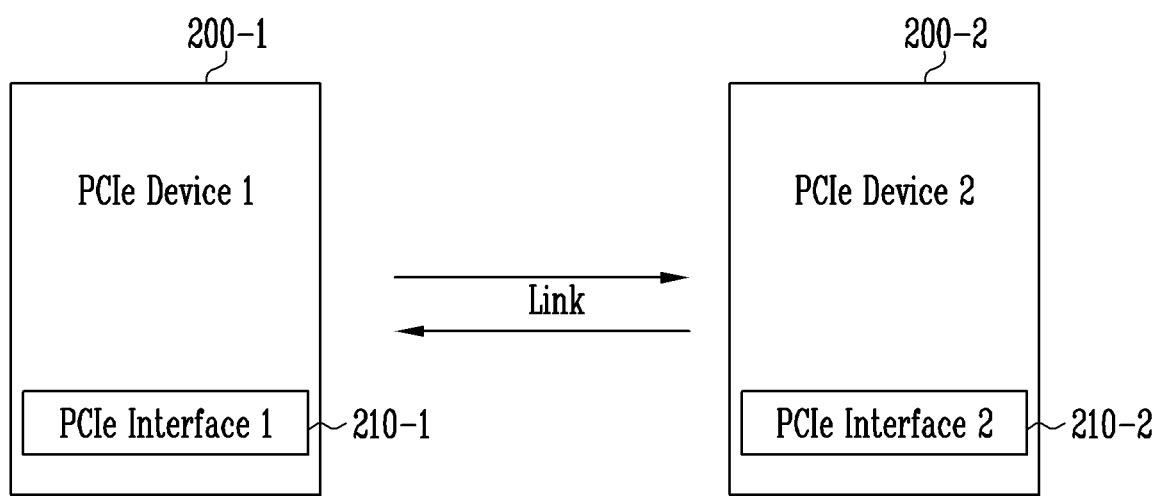
FIG. 2 is a diagram illustrating a PCIe device according to an embodiment of the present disclosure.

FIG. 2 is a diagram illustrating a PCIe device according to an embodiment of the present disclosure.

Referring to FIG. 2, a PCIe device may include a PCIe interface and be an electronic device that supports transmission and reception using the PCIe interface. For example, a first PCIe device 200-1 or a second PCIe device 200-2 may include one of the root complex 120, the switch 140, the PCIe endpoints 150_1 to 150_3, the legacy endpoints 160_1 and 160_2, and the PCIe to PCI/PCI-X bridge 170 as shown in FIG. 1.

In addition, the first PCIe device 200-1 or the second PCIe device 200-2 may perform communication using a first PCIe interface 210-1 or a second PCIe interface 210-2, respectively. More specifically, the first PCIe device 200-1 may convert data to be transmitted to the second PCIe device 200-2 into a protocol adapted for communication by using the first PCIe interface 210-1. In addition, the first PCIe device 200-1 and the second PCIe device 200-2 may form a link. The first PCIe device 200-1 and the second PCIe device 200-2 may perform communication through the link. For example, the first PCIe device 200-1 or the second PCIe device 200-2 may transmit or receive packets through the link.

Figure 3:
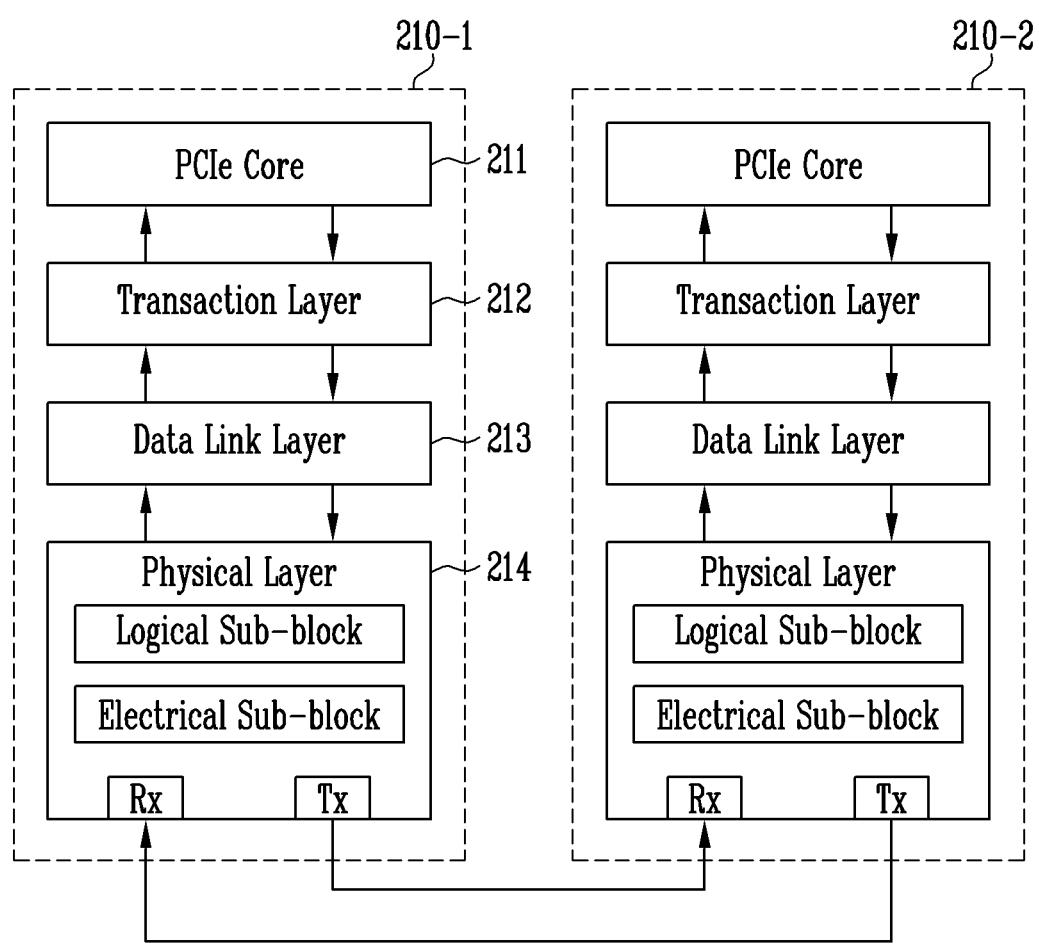
FIG. 3 is a diagram illustrating a PCIe interface according to an embodiment of the present disclosure.

FIG. 3 is a diagram illustrating PCIe interfaces according to an embodiment of the present disclosure.

FIG. 3 shows the first PCIe interface 210-1 and the second PCIe interface 210-2 of FIG. 2. The first PCIe interface 210-1 and the second PCIe interface 210-2 may have the same structure. Thus, a description of the first PCIe interface 210-1 below may be equally applied to the second PCIe interface 210-2.

PCIe layers included in the first PCIe interface 210-1 may include three discrete logical layers. For example, the first PCIe interface 210-1 may include a PCIe core 211, a transaction layer 212, a data link layer 213, and a physical layer 214. Each of the layers (212, 213 and 214) may include two sections. More specifically, one section TX may process outbound information (or information to be transmitted), and the other section RX may process inbound information (or information received). In addition, the first PCIe interface 210-1 may use packets for communicating information with other PCIe interfaces.

The PCIe core 211 may control the entire first PCIe interface 210-1. More specifically, the PCIe core 211 may include a software layer for operating the interface. In addition, the PCIe core 211 may transfer an address, a transaction type, and data to the transaction layer 212, or may receive an address, a transaction type, and data from the transaction layer 212.

The transaction layer 212 may be an upper layer in the architecture of the PCIe interface. The transaction layer 212 may assemble and disassemble transaction layer packets (TLPs). In addition, the transaction layer 212 may implement a split transaction, i.e., a transaction that allows other traffic to be transmitted to a link while a target system assembles data for responses. For example, the transaction layer 212 may implement a transaction in which a request and a response are temporally separated from each other. According to an embodiment, four transaction address spaces may consist of a configuration address space, a memory address space, an input/output address space, and a message address space. A memory space transaction may include at least one of a read request and a write request for transmitting data from/to a memory-mapped location. According to an embodiment, the memory space transaction may use two different address formats, for example, a short address format such as a 32-bit address, or a long address format such as a 64-bit address. A configuration space transaction may be used to access a configuration space of a PCIe device. A transaction directed toward the configuration space may include a read request and a write request. A message space transaction (or message) may be defined to support in-band communication between PCIe devices.

The transaction layer 212 may store link configuration information received from the PCIe core 211. In addition, the transaction layer 212 may generate TLPs requested by the PCIe core 211 or may convert the received TLPs into payload or status information.

A middle layer in the architecture of the PCIe interface may be the data link layer 213. The data link layer 213 may serve as an intermediate stage between the transaction layer 212 and the physical layer 214. The primary responsibilities of the data link layer 213 may include link management and data integrity, including error detection and error correction. More specifically, a transmission side of the data link layer 213 may accept the TLPs assembled by the transaction layer 212, apply a data protection code, or calculate a TLP sequence number. In addition, the transmission side of the data link layer 213 may transmit the data protection code and the TLP sequence number to the physical layer 214. A reception side of the data link layer 213 may check the integrity of the TLPs received from the physical layer 214 and transmit the TLPs to the transaction layer 212 for further processing.

The physical layer 214 may include circuitry for an interface operation. The physical layer 214 may include a driver, an input buffer, a serial-to-parallel conversion circuit, a parallel-to-serial conversion circuit, phase locked loops (PLLs), and impedance matching circuitry.

In addition, the physical layer 214 may include logical sub-blocks and electrical sub-blocks that physically transmit packets to an external PCIe device. A logical sub-block may serve to perform a 'digital' function of the physical layer 214. More specifically, a logical sub-block may include a transmit section that prepares transmission information by a physical sub-block and a receiver section that identifies and prepares received information before passing the received information to the data link layer 213. The physical layer 214 may include a transmitter Tx and a receiver Rx. The transmitter Tx may transmit a symbol serialized by the logical sub-block to an external device. In addition, the receiver Rx may receive the serialized symbol from the external device and convert the received signal into a bit stream. The bit stream may be de-serialized and supplied to the logical sub-block. In other words, the physical layer 214 may convert the TLPs received from the data link layer 213 into a serialized format and convert packets received from an external device into a de-serialized format. In addition, the physical layer 214 may include logical functions related to interface initialization and maintenance.

FIG. 3 exemplifies the architectures of the first PCIe interface 210-1 and the second PCIe interface 210-2. However, the architectures of PCIe interfaces in other embodiments may include any architecture such as a quick path interconnect architecture, a next generation high performance computing interconnect architecture, or another layered architecture.

Figure 4:
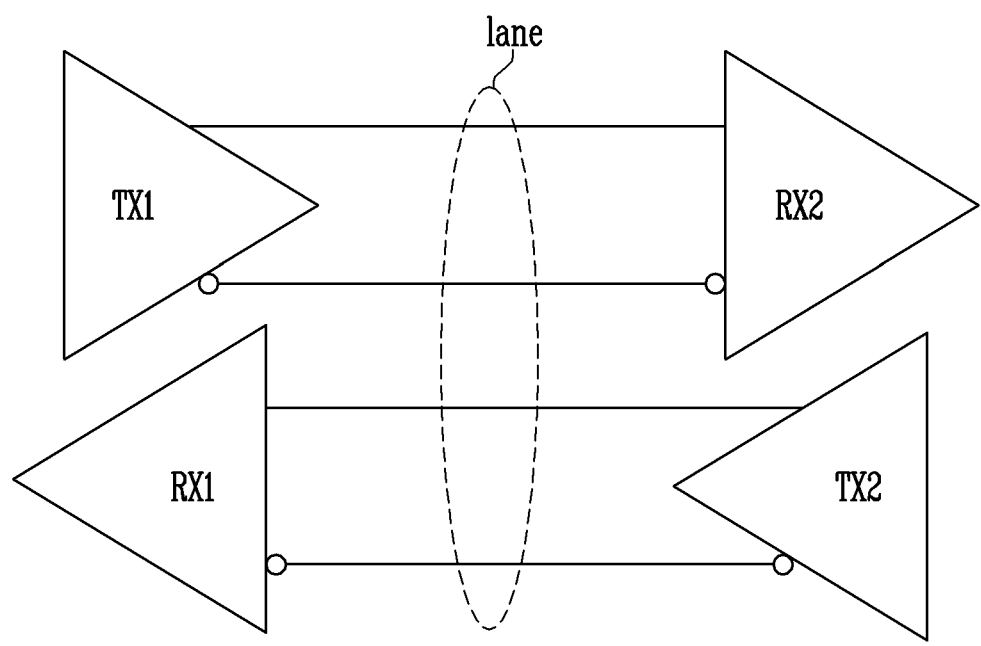
FIG. 4 is a diagram illustrating a transmitter, a receiver and a lane according to an embodiment of the present disclosure.

FIG. 4 is a diagram illustrating a transmitter, a receiver, and a lane according to an embodiment of the present disclosure.

FIG. 4 illustrates a first transmitter TX1, a second transmitter TX2, a first receiver RX1, and a second receiver RX2. A lane may include paths that include differentially driven signal pairs, e.g., a transmission path pair configured for transmission and a reception path pair configured for reception. A PCIe device may include transmission logic that transmits data to another PCIe device and reception logic that receives data from another PCIe device. For example, a PCIe device may include two transmission paths coupled to the first transmitter TX1 and two reception paths coupled to the first receiver RX1.

A transmission path may refer to an arbitrary path for data transmission, such as a transmission line, a copper line, a wireless communication channel, an infrared communication link, or another communication path. In addition, a reception path may be realized in the same manner as the transmission path, and the reception path may be provided for reception.

A connection between two PCIe devices, for example the first PCIe device 200-1 and the second PCIe device 200-2 as shown in FIG. 2, may be referred to as a link. A link may support at least one lane. In addition, each lane may be indicated by a set of differential signal pairs (one pair for transmission and the other pair for reception). A differential signal pair may refer to two signals that have the same frequency and amplitude, but opposite phases. For example, when a first signal has a rising edge that toggles from 0 to a voltage level of V+, a second signal may have a falling edge that toggles from 0 to a voltage level of V−. A PCIe device may use signal integrity, for example, electrical characteristics such as cross-coupling, voltage overshoot/undershoot, and ringing, and may control the transmission frequency more quickly by using differential signals. In addition, a PCIe device may include a plurality of lanes to control bandwidth. For example, two PCIe devices may form a link that consists of 1, 2, 4, 8, 12, 16, or 64 lanes.

Figure 5:
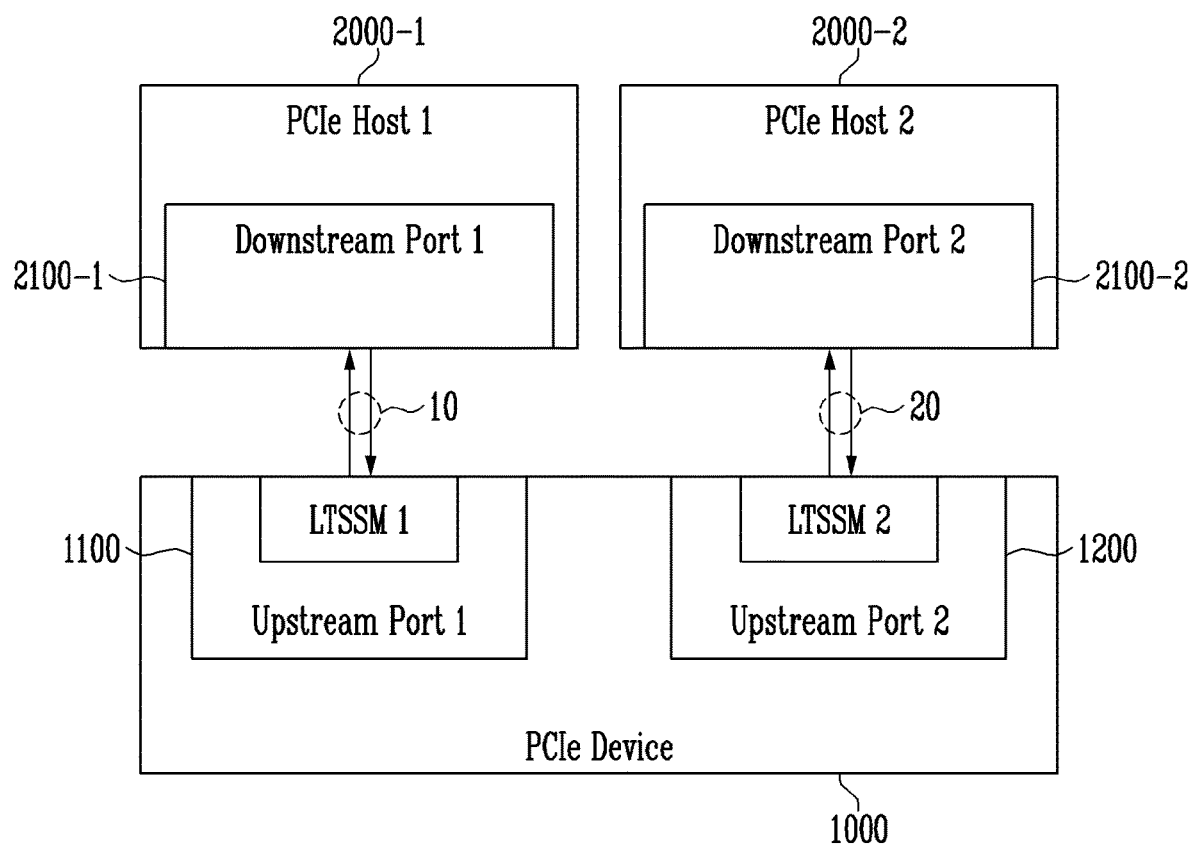
FIG. 5 is a diagram illustrating a dual port mode and a single port mode according to an embodiment of the present disclosure.

FIG. 5 is a diagram illustrating a dual port mode and a single port mode according to an embodiment of the present disclosure.

Referring to FIG. 5, a PCIe device 1000 may link up with a first PCIe host 2000-1 and a second PCIe host 2000-2. A link-up may refer to a state in which a connection is established to enable logical data communication. The first PCIe host 2000-1 and the second PCIe host 2000-2 may be in upper layers compared to the PCIe device 1000. In addition, data movement and transmission to an upper layer may be referred to as "upstream" and a port that supports upstream may be referred to as an "upstream port." On the other hand, data movement and transmission to a lower layer may be referred to as "downstream" and a port that supports downstream may be referred to as a "downstream port." For example, referring to FIG. 1, the switch 140 may support downstream and upstream routing. More specifically, upstream may refer to routing up a hierarchy towards the root complex 120 from the PCIe endpoint (e.g., 150_1), and downstream may refer to routing down a hierarchy away from the root complex 120 towards the PCIe endpoint (e.g., 150_2).

The PCIe device 1000 may include a first upstream port 1100 and a second upstream port 1200. In addition, the PCIe device 1000 may perform data communication with the first PCIe host 2000-1 and the second PCIe host 2000-2 in a dual port mode in which the first upstream port 1100 and the second upstream port 1200 operate independently of each other.

More specifically, the first upstream port 1100 included in the PCIe device 1000 may link up with the first PCIe host 2000-1 using a first link 10. In addition, the second upstream port 1200 included in the PCIe device 1000 may link up with the second PCIe host 2000-2 using a second link 20. The first upstream port 1100 may link up with a first downstream port 2100-1 of the first PCIe host 2000-1. The second upstream port 1200 may link up with a second downstream port 2100-2 of the second PCIe host 2000-2. A link width of each of the first and second links 10 and 20 may include a lane such as ×1, ×2, ×4, ×8, ×12, ×16, ×32, and ×64.

According to an embodiment, when the PCIe device 1000 operates in the dual port mode, errors, such as a clock error, which occur in the first link 10 between the first upstream port 1100 and the first downstream port 2100-1 may not influence the second link 20 between the second upstream port 1200 and the second downstream port 2100-2.

According to an embodiment, each of the first and second upstream ports 1100 and 1200 may include a PCIe interface and a Link Training & Status State Machine (LTSSM) (also referred as a link training module). In other words, PCIe interfaces and LTSSMs of the first and second upstream ports 1100 and 1200 may be independent of each other. More specifically, the first upstream port 1100 may include a first LTSSM 1 and the second upstream port 1200 may include a second LTSSM 2. In addition, the first LTSSM 1 and the second LTSSM 2 may independently perform link training of the first link 10 and link training of the second link 20.

Figure 6:
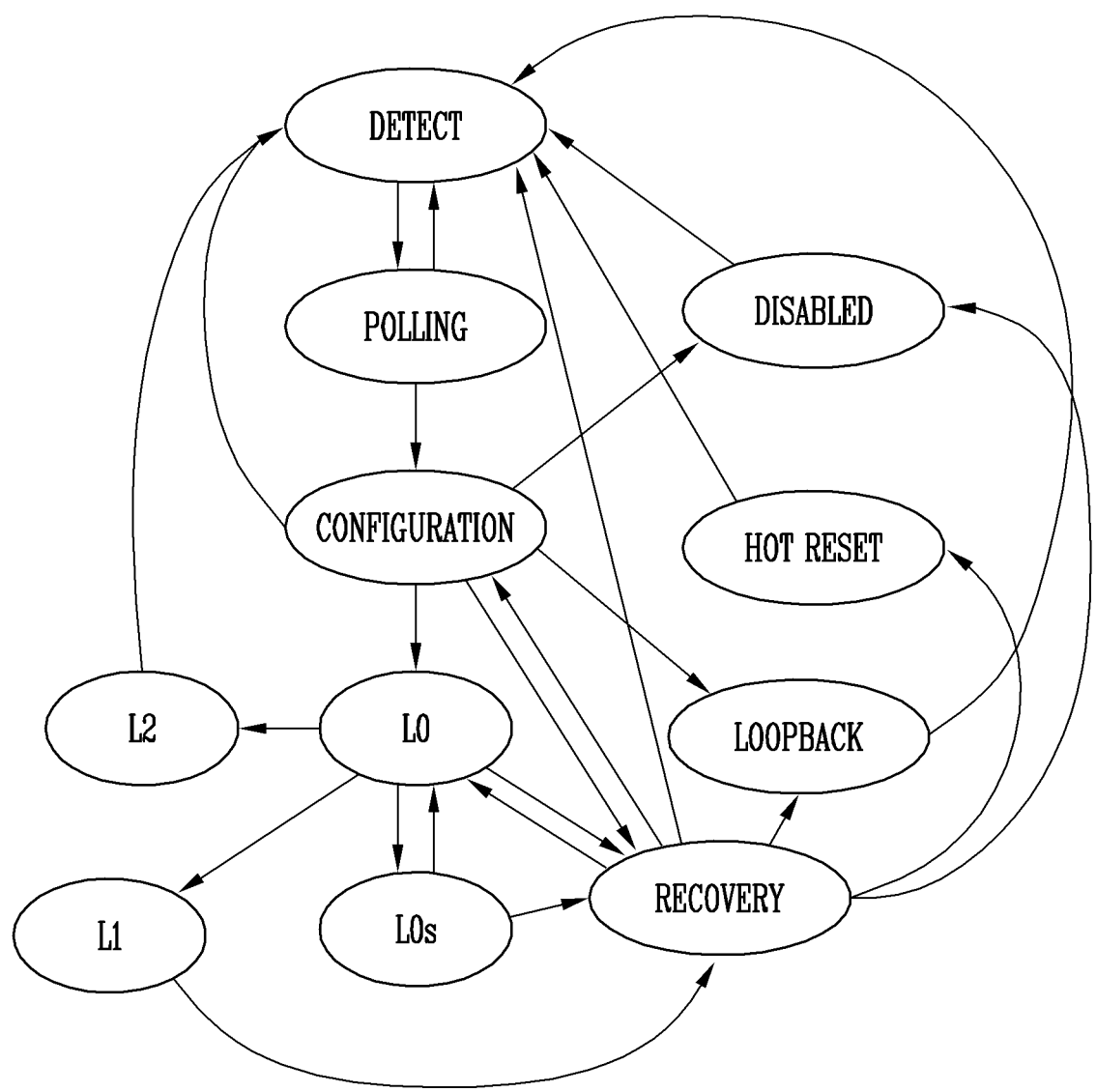
FIG. 6 is a diagram illustrating a link status of a PCIe device according to an embodiment of the present disclosure.

FIG. 6 is a diagram illustrating a link status of a PCIe device according to an embodiment of the present disclosure.

As shown in FIG. 6, a link status of a PCIe device may include detect, polling, configuration, hot reset, disabled, and L0 states.

The detect state may refer to an initial state after power on or reset. The detect state may be entered from the states to be described below. For example, the detect state may be entered from the configuration state, the hot reset state, the disabled state, the polling state, an L2 state, a loopback state, and a recovery state. In the detect state, all logics, ports and registers may be reset, and a link coupled to the PCIe interface may be detected. In other words, a PCIe device in the detect state may search for a physically coupled lane.

In the polling state, a lane that enables data communication may be distinguished from the detected lanes. In the polling state, clocks at both ends of the PCIe interface may be synchronized and it may be confirmed whether the lane has a polarity of D+ or D−, for example. In addition, a data transmission speed available for the lane may be checked. In other words, in the polling state, polarity inversion may be checked. In addition, a link in the polling state may enter the detect state or the configuration state.

In the configuration state, a connection state of the lane may be checked. More specifically, in the configuration state, a lane width that enables data communication may be determined. In addition, in the configuration state, a lane reversal may be checked. The configuration state may be entered from the polling state. Alternatively, however, after entering the L0 state, the configuration state may be entered in the event of a lane reduction or a lane width increase.

The recovery state may be used to reconfigure a link bandwidth. In the recovery state, a link bandwidth of a set link may be changed, and bit lock, symbol lock and laneto-lane de-skew may be reset. The recovery state may be entered when an error occurs in the L0 state. Thereafter, after the error is recovered in the recovery state, the state may be changed into the L0 state. In addition, according to an embodiment, in the recovery state, an equalization operation of the link may be performed.

The L0 state may be a normal operational state in which data and packets are transmitted and received through the link. More specifically, the L0 state may be an operational state of a physical bus interface where data and control packets may be transmitted and received. The L0 state may be a fully active state.

An L0s state may refer to a state in which the physical bus interface may enter quickly into a power conservation state and recover therefrom without going through the recovery state.

The L0s state may be a power saving state. The L0s state may refer to an idle or standby state of some functions in the interface.

The L1 state may be a power saving state. The L1 state may refer to a power saving state that allows additional power savings over the L0s state. The L1 state may be a low power standby state.

The L2 state may be a power saving state that aggressively conserves power. Most of the transmitters and receivers may be shut off. Although a main power supply and clocks are not guaranteed, an auxiliary power supply may be provided. The L2 state may be a low power sleep state in which power is not supplied to most of the functions.

The loopback state may be intended for test and fault isolation use. The loopback state may operate on a per lane basis and a loopback receive lane must be selected and configured.

The disabled state may allow a set link to be disabled until directed. The hot reset state may only be triggered by the downstream port. The downstream port may use training sequences (e.g., TS1 or TS2) to propagate hot reset. The training sequences TS may be composed of ordered sets used for initializing bit alignment, symbol alignment and to exchange physical layer parameters.

FIGS. 7 to 10 are diagrams illustrating a dual port mode and a single port mode according to embodiments of the present disclosure.

In FIGS. 7 to 10, PCIe Phy is designed to maximize interface speed in the difficult system environments found in high-performance computing. The PCIe Phy is a low-power, area-optimized, silicon-proven IP designed with a system-oriented approach to maximize flexibility and ease integration for customers. Multiplexer (Mux) is a combinational logic circuit designed to switch one of several input lines through to a single common output line by the application of a control signal. The Mux operates like very fast acting multiple position rotary switches connecting or controlling multiple input lines called "channels" one at a time to the output.

Referring to FIGS. 7 to 10, a PCIe device 1000 (not shown) may include a first upstream port 1100 and a second upstream port 1200. In addition, the first upstream port 1100 may link up with the first downstream port 2100-1, and the second upstream port 1200 may link up with the second downstream port 2100-2 through a link that operates independently of the first upstream port 1100. Each of the first upstream port 1100 and the second upstream port 1200 may include an LTSSM, which controls a status of a link that is physically or logically connected to an LTSSM.

According to an embodiment, the PCIe device 1000 may change an operating mode from a single port mode to a dual port mode in a state in which a link is linked up. Alternatively, the PCIe device 1000 (specifically, a port mode controller thereof) may change the operating mode from a dual port mode to a single port mode in a state where at least one link is linked up. The port mode controller may control the second port to reset the second link in response to a mode change request from the first host to change from the dual port mode to the single port mode.

Figure 7:
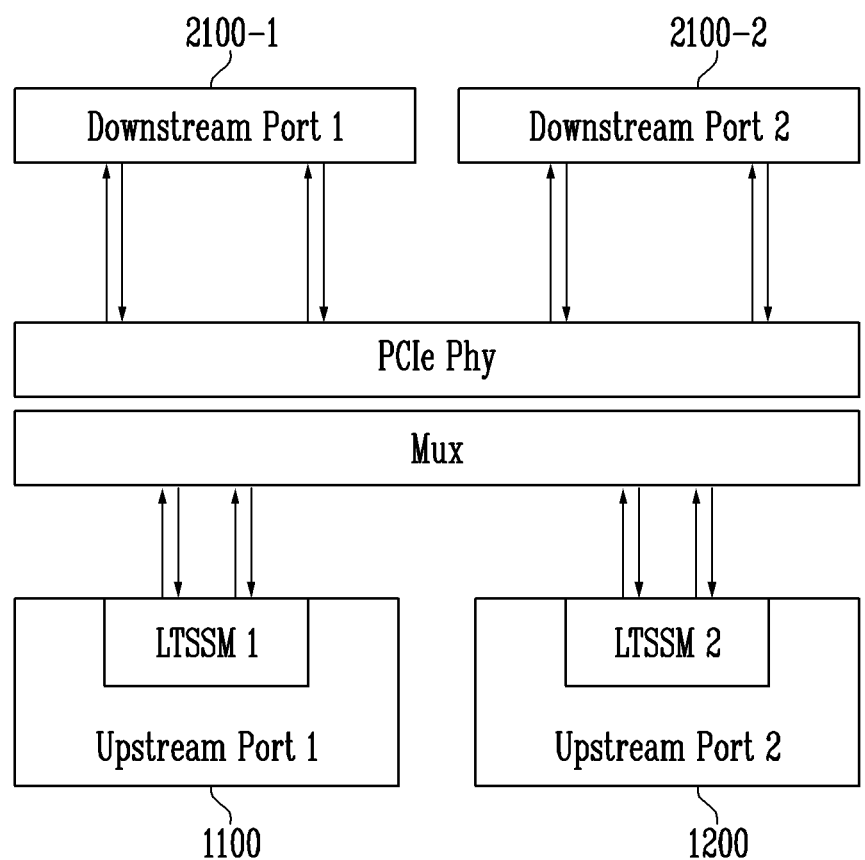
FIG. 7 is a diagram illustrating a dual port mode and a single port mode according to an embodiment of the present disclosure.

Referring to FIG. 7, a dual port mode may be configured such that the first upstream port 1100 and the second upstream port 1200 of the PCIe device 1000 are connected to the first downstream port 2100-1 and the second downstream port 2100-2, respectively. According to an embodiment, the first downstream port 2100-1 and the second downstream port 2100-2 may be included in one host and realized as independent ports. Alternatively, however, the first downstream port 2100-1 and the second downstream port 2100-2 may be included in different hosts. Referring to FIG. 7, the links connected to the first upstream port 1100 and the second upstream port 1200 may logically enable data communication.

Figure 8:
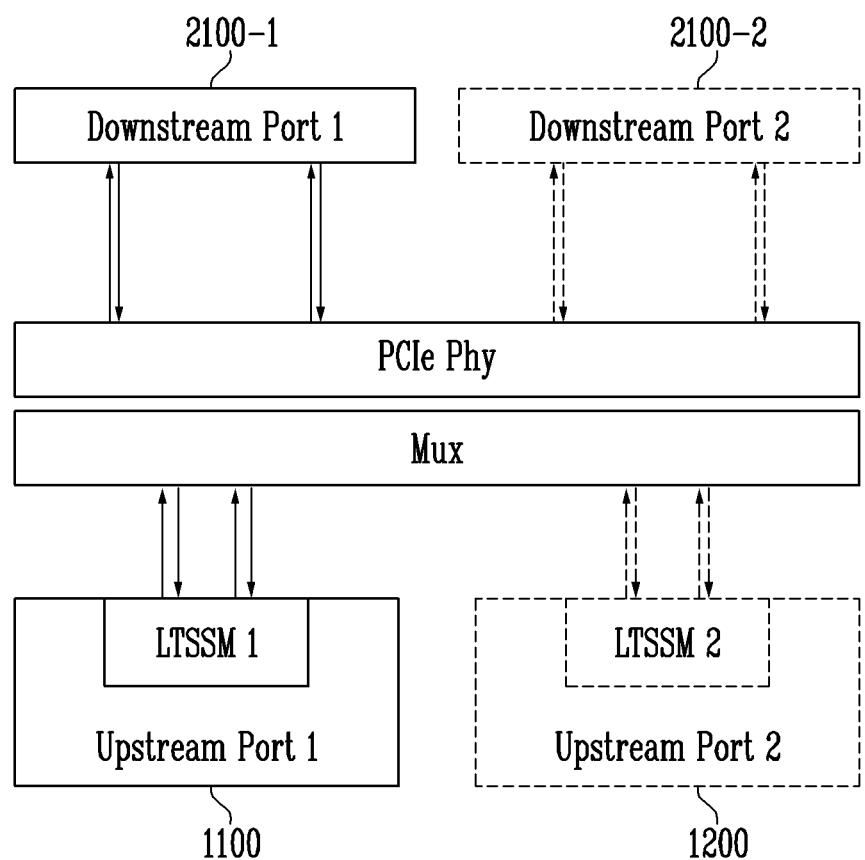
FIG. 8 is a diagram illustrating a dual port mode and a single port mode according to an embodiment of the present disclosure.

Referring to FIG. 8, the first upstream port 1100 and the second upstream port 1200 of the PCIe device 1000 may configure a single port mode in which data communication using only the first upstream port 1100 is possible. More specifically, when the operating mode of the PCIe device 1000 changes from the dual port mode to the single port mode, the link status of the first upstream port 1100 may be an L0 state, and the link status of the second upstream port 1200 may be in a reset state (e.g., a cold reset, a warm reset, or a hot reset) in which the linked-up link is initialized, or a disabled state in which the linked-up link is disabled. However, when the operating mode of the PCIe device 1000 changes from the single port mode to the dual port mode, the link status of the first upstream port 1100 may be the L0 state, and the link status of the second upstream port 1200 may be a state in which link training is being performed for link connection. For example, the link status of the second upstream port 1200 may be one of the detect state, the polling state, and the configuration state. According to an embodiment, since the link status of the first upstream port 1100 is the L0 state, regardless of the link status of the second upstream port 1200, the PCIe device 1000 may maintain data communication with the first downstream port 2100-1 using the first upstream port 1100.

Figure 9:
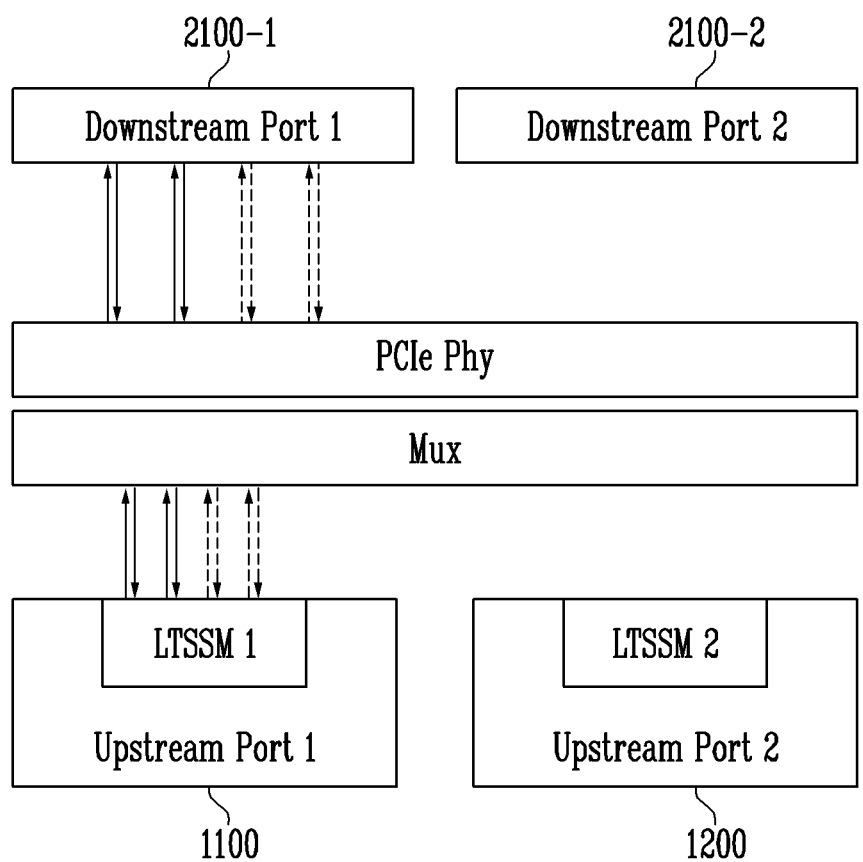
FIG. 9 is a diagram illustrating a dual port mode and a single port mode according to an embodiment of the present disclosure.

Referring to FIG. 9, the first upstream port 1100 and the second upstream port 1200 of the PCIe device 1000 may operate in a single port mode where data communication using only the first upstream port 1100 is possible. More specifically, when the operating mode of the PCIe device 1000 (or LTSSM 1) changes from the dual port mode to the single port mode, the first upstream port 1100 may perform an up-configure operation to increase a lane width configuring a link in response to the control of the port mode controller. For example, the first upstream port 1100 may increase a lane width of the link connected to the first upstream port 1100 from an X2 lane to an X4 lane. More specifically, to configure the link of the first upstream port 1100 with the maximum lane width, the first LTSSM 1 may change the link status of the first upstream port 1100 sequentially to the L0 state, the recovery state, and the configuration state, and may perform an up-configure operation to increase a lane width in each state.

On the other hand, when the operating mode of the PCIe device 1000 changes from the single port mode to the dual port mode, the first upstream port 1100 may perform a lane reduce operation to reduce a lane width configuring a link.

For example, the first upstream port 1100 may reduce a lane width of the link connected to the first upstream port 1100 from an X4 lane to an X2 lane. More specifically, the PCIe device 1000 may reduce the lane width of the first upstream port 1100 to change the operating mode from a single port mode in which only the first upstream port 1100 operates into a dual port mode in which the first upstream port 1100 and the second upstream port 1200 operate independently of each other. The first LTSSM 1 may change the link status of the first upstream port 1100 sequentially to the L0 state, the recovery state, and the configuration state in a sequential manner, and may perform a lane reduce operation to reduce the lane width in each state.

Figure 10:
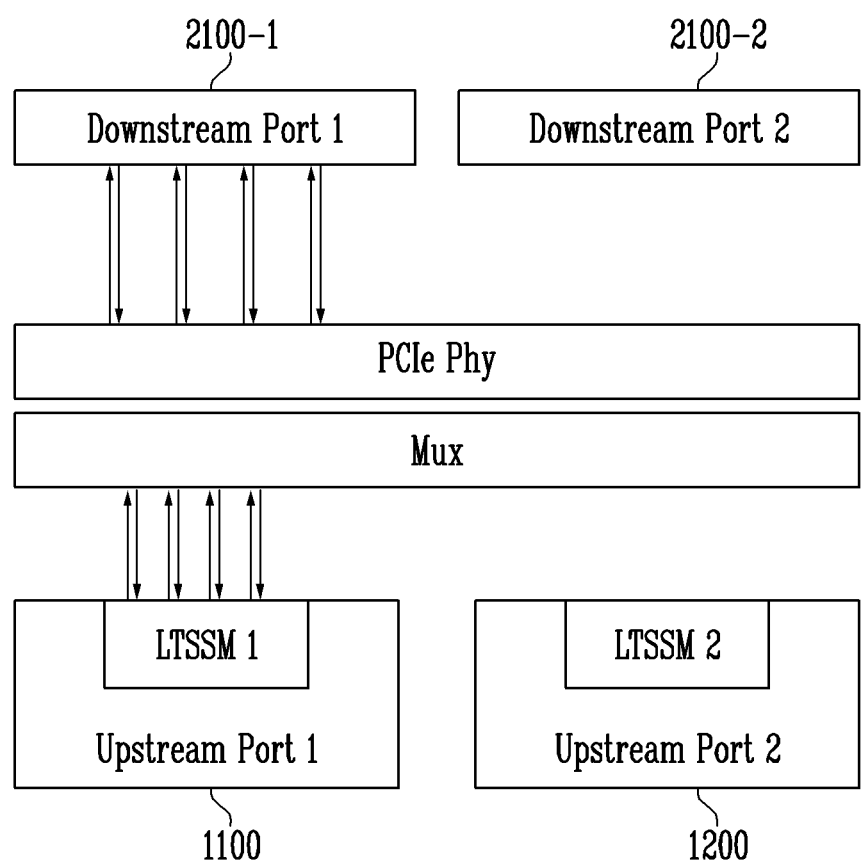
FIG. 10 is a diagram illustrating a dual port mode and a single port mode according to an embodiment of the present disclosure.

Referring to FIG. 10, the first upstream port 1100 and the second upstream port 1200 of the PCIe device 1000 may configure a single port mode where data communication using only the first upstream port 1100 is possible. According to an embodiment, the link connected to the first downstream port 2100-1 may be realized with the maximum lane width. However, according to an embodiment, in a state where the first upstream port 1100 and the second upstream port 1200 are connected to the same host, if an error occurs in the link connected to the second upstream port 1200 or in data communication, then the PCIe device 1000 may accelerate data communication using only the first upstream port 1100 until the error is recovered.

Referring to FIGS. 7 to 10, the PCIe device 1000 may receive an operating mode change request from the host to change from a dual port mode to a single port mode. In addition, in response to the operating mode change request from the host, the PCIe device 1000 may change the status of the link connected to the first upstream port 1100 and the second upstream port 1200 sequentially into the link statuses corresponding to those in FIGS. 8, 9, and 10.

However, referring to FIGS. 7 to 10, the PCIe device 1000 may receive an operating mode change request from the host to change from a dual port mode to a single port mode. In addition, in response to the operating mode change request from the host, the PCIe device 1000 may change the status of the link connected to the first upstream port 1100 and the second upstream port 1200 sequentially into the link statuses corresponding to those in FIGS. 10, 9, 8, and 7.

Figure 11:
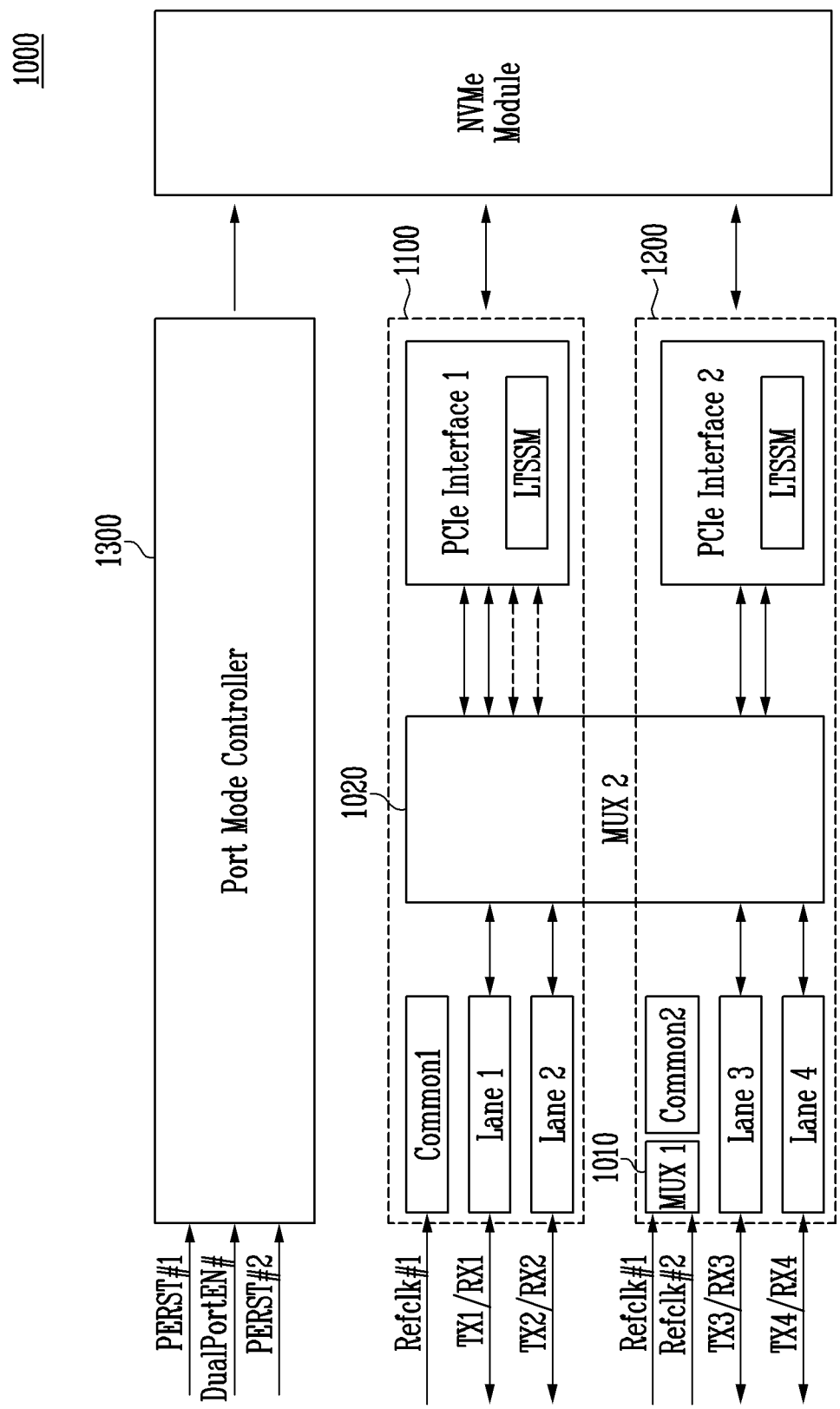
FIG. 11 is a diagram illustrating the configuration of a PCIe device according to an embodiment of the present disclosure.

FIG. 11 is a diagram illustrating the configuration of a PCIe device according to an embodiment of the present disclosure.

Referring to FIG. 11, a PCIe device 1000 may include a first upstream port (also referred as a first port) 1100, a second upstream port (also referred as a second port) 1200, and a port mode controller 1300. The PCIe device 1000 may perform data communication in a single port mode using only the first upstream port 1100. More specifically, the PCIe device 1000 may link up the first upstream port 1100 with an external device by using at least one of the first to fourth lanes. FIG. 11 illustrates a PCIe device 1000 having the four lanes, however, PCIe devices contemplated by the disclosure may include more than four lanes.

When the PCIe device 1000 operates in the single port mode using the first to fourth lanes, the port mode controller 1300 may control a first multiplexer (MUX1) 1010 so that the same reference clock may be input to each circuit. More specifically, when the PCIe device 1000 operates in the single port mode, the port mode controller 1300 may control the first multiplexer 1010 so that a first reference clock Refclk #1 may be input to each circuit between the first reference clock Refclk #1 and a second reference clock Refclk #2, which are input to the first multiplexer 1010. In addition, when the PCIe device 1000 operates in the single port mode, the port mode controller 1300 may control a second multiplexer (MUX2) 1020 so that a signal transmitted from the third lane and the fourth lane may be transmitted to a first PCIe interface 1.

In addition, the PCIe device 1000 may perform data communication in the dual port mode using both the first upstream port 1100 and the second upstream port 1200. The PCIe device 1000 may link up with at least one host using the first upstream port 1100 and the second upstream port 1200.

When the PCIe device 1000 operates in the dual port mode, the PCIe device 1000 may control an internal circuit using the port mode controller 1300. More specifically, when the PCIe device 1000 operates in the dual port mode, the port mode controller 1300 may control the first multiplexer 1010 so that the first reference clock Refclk #1 may be provided to the first upstream port 1100 and the second reference clock Refclk #2, which is different from the first reference clock Refclk #1, may be provided to the second upstream port 1200. In addition, when the PCIe device 1000 operates in the dual port mode, the port mode controller 1300 may control the second multiplexer 1020 so that the signal transmitted from the third lane and the fourth lane may be transmitted to a second PCIe interface 2.

The PCIe device 1000 may reset the PCIe interfaces included in the first upstream port 1100 and the second upstream port 1200, respectively, in response to a first PCIe reset signal PERST #1 and a second PCIe reset signal PERST #2, which are received from the host. In addition, the PCIe device 1000 may change the operating mode to the single port mode or the dual port mode in response to a dual port enable signal DualPortEn # received from the host. More specifically, the port mode controller 1300 may reset the first PCIe interface 1 and the LTSSM included in the first upstream port 1100 in response to the first PCIe reset signal PERST #1. The port mode controller 1300 may reset the second PCIe interface 2 and the LTSSM included in the second upstream port 1200 in response to the second PCIe reset signal PERST #2.

Figure 12:
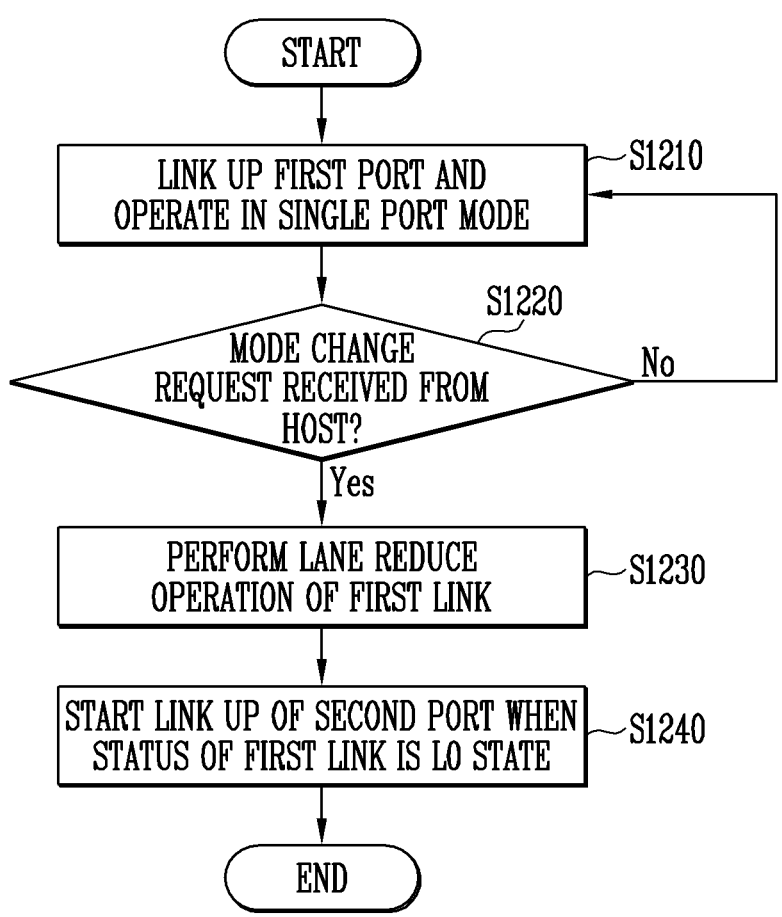
FIG. 12 is a diagram illustrating a method of changing a PCIe device from a single port mode to a dual port mode according to an embodiment of the present disclosure.

FIG. 12 is a diagram illustrating a method of changing a PCIe device from a single port mode to a dual port mode according to an embodiment of the present disclosure.

In FIG. 12, a method of operating a PCIe device 1000 is sequentially illustrated. More specifically, the PCIe device 1000 may include a first port and a second port. In addition, the PCIe device 1000 may link up the first port with a first host and operate in a single port mode at step S1210. More specifically, the PCIe device 1000 may perform a first link training operation to link up the first host with a first link of the first port. The single port mode may refer to a mode in which only the first port operates as between the first and second ports.

In addition, when the PCIe device 1000 receives a mode change request from the host (S1220_YES), the PCIe device 1000 may perform a lane reduce operation of the first link at step S1230. The lane reduce operation may refer to an operation of reducing a lane width (or a link width) corresponding to the first link.

When a status of the first link of the first port becomes an L0 state, the PCIe device 1000 may start a link up of the second port at step S1240. More specifically, when the lane reduce operation of the first port is completed and the status of the first link of the first port returns to the L0 state, the PCIe device 1000 (specifically, a port mode controller thereof) may perform a second link training operation to link up a second link.

In addition, when the second link training operation is completed, the PCIe device 1000 may operate in the dual port mode in which the first port and the second port operate independently of each other. In other words, data communication performed or errors occurring in one of the first and second ports does not influence the operation of the other port. To operate in the dual port mode, each of the first port and the second port may include an LTSSM, a PCIe interface, and the like. The PCIe interface may mean an interface including a transaction layer, a data link layer, and a physical layer, which operate in a status of a link according to PCIe standards in response to the respective control of each of LTSSM 1 and LTSSM 2.

Figure 13:
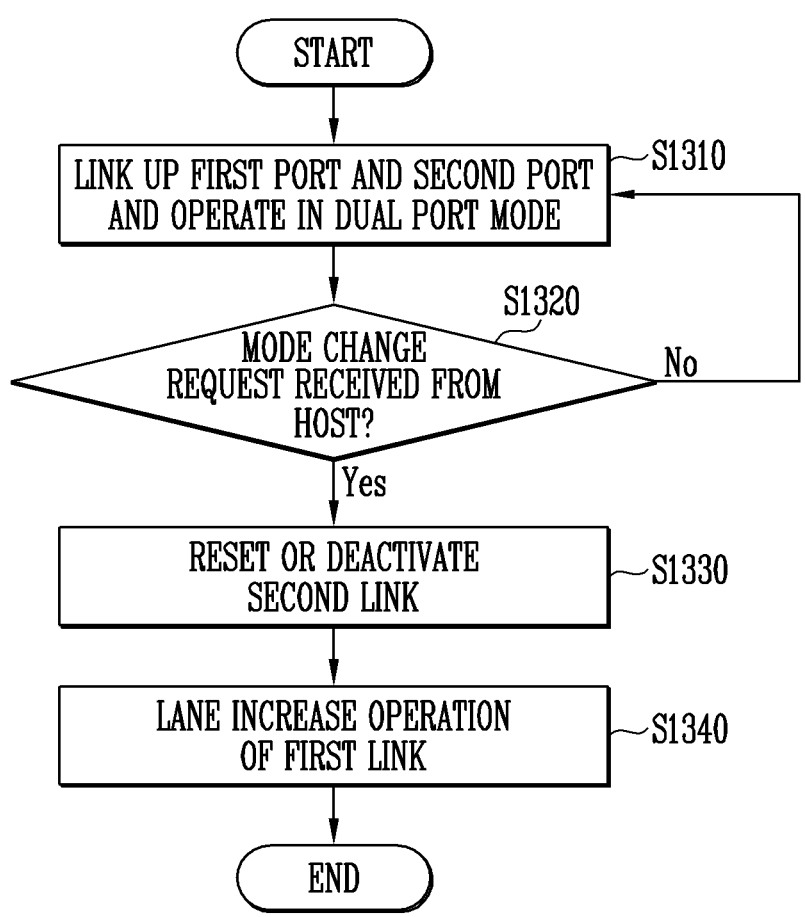
FIG. 13 is a diagram illustrating a method of changing a PCIe device from a dual port mode to a single port mode according to an embodiment of the present disclosure.

FIG. 13 is a diagram illustrating a method of changing a PCIe device from a dual port mode to a single port mode according to an embodiment of the present disclosure.

Referring to FIG. 13, a method of operating a PCIe device 1000 is sequentially illustrated. More specifically, the PCIe device 1000 may include a first port and a second port. In addition, the PCIe device 1000 may link up the first and second ports and operate in a dual port mode at step S1310. More specifically, the PCIe device 1000 may link up the first port with the first host and the second port with the second host. In other words, the PCIe device 1000 may independently perform a first link training operation to link up the first host with a first link of the first port and a second link training operation to link up the second host with a second link of the second port. A link up may refer to an operation of connecting a link to the host logically to make data communication with the host possible. A link training operation may refer to an overall operation to control the settings associated with the corresponding link to perform a link up.

In addition, when the PCIe device 1000 receives a mode change request from the host (S1320_YES), the PCIe device 1000 (specifically, a port mode controller thereof) may control LTSSM 2 to reset or deactivate the second link at step S1330. Reset or deactivation may mean physically or logically disconnecting the link that links up with the host. In addition, according to an embodiment, when the PCIe device 1000 (specifically, a port mode controller thereof) may control the second port to reset or deactivate the second link, the first link may maintain a linked up state (e.g., the L0 state).

In addition, when the reset or the deactivation of the second link is completed, the PCIe device 1000 (specifically, a port mode controller thereof) may control LTSSM 1 to perform a lane increase operation to increase the lane width of the first link at step S1340. When the PCIe device 1000 performs the lane increase operation on the first link, the status of the first link may change sequentially into the L0 state, the recovery state, and the configuration state, and the L0 state. Since data communication is possible logically during the lane increase operation on the first link, the first link may be referenced as in the linked up state.

In addition, when the lane increase operation on the first link is completed, the PCIe device 1000 may operate in a single port mode in which only the first port operates, and the PCIe device 1000 may set the lane width of the first link to the maximum lane width.

According to the present disclosure, a method of operating an improved PCIe device by changing a port mode may be provided.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

What is claimed is:

1. A Peripheral Component Interconnect Express (PCIe) device, comprising:
    a first port linking up with a first host using a first link;
    a second port linking up with the first host or a second host using a second link; and
    a port mode controller controlling the first port and the second port to change an operating mode from a dual port mode, in which the first port and the second port operate independently of each other, to a single port mode in which only the first port operates,
    wherein the port mode controller controls the second port to reset the second link while the first link is configured to communicate data between the first port and the first host.

2. The PCIe device of claim 1, wherein the first port comprises a first link training module changing a status of the first link, and
    wherein the second port comprises a second link training module changing a status of the second link.

3. The PCIe device of claim 2, wherein the port mode controller controls the second link training module to reset the second link while the first link maintains data communication between the first port and the first host, and controls the first link training module to extend a lane width of the first link when the second link reset is completed.

4. The PCIe device of claim 3, wherein the first link training module performs an up-configure operation to increase the lane width of the first link in response to the control of the port mode controller.

5. The PCIe device of claim 3, wherein the first link training module changes the status of the first link sequentially to a normal operational state in which data and packets are transmitted and received through the first link, a recovery state, a configuration state, and the normal operational state in which data and packets are transmitted and received through the first link.

6. The PCIe device of claim 1, wherein each of the first port and the second port comprises a PCIe interface including a transaction layer, a data link layer, and a physical layer operating as a link according to PCIe standards in response to the respective control of each of the first link training module and the second link training module.

7. The PCIe device of claim 1, wherein the port mode controller controls the second port to reset the second link in response to a mode change request from the first host to change from the dual port mode to the single port mode.

8. A Peripheral Component Interconnect Express (PCIe) device, comprising:
    a first port linking up with a first host using a first link;
    a second port linking up with the first host or a second host using a second link; and
    a port mode controller controlling the first port and the second port to change an operating mode from a single port mode, in which only the first port operates, to a dual port mode in which the first port and the second port operate independently of each other, wherein the port mode controller controls the second port to perform a link training operation to link up the second link while the first link communicates data between the first port and the first host.

9. The PCIe device of claim 8, wherein the first port comprises a first link training module changing a status of the first link, and wherein the second port comprises a second link training module changing a status of the second link.

10. The PCIe device of claim 9, wherein the port mode controller controls the first link training module to perform a lane reduce operation to reduce a lane corresponding to the first link when the first link is configured to communicate data between the first port and the first host, and controls the second link training module to perform the link training operation when the lane reduce operation is completed.

11. The PCIe device of claim 10, wherein the first link training module changes the status of the first link sequentially to a normal operational state in which data and packets are transmitted and received through the first link, a recovery state, a configuration state, and the normal operational state in which data and packets are transmitted and received through the first link in response to the control of the port mode controller.

12. The PCIe device of claim 8, wherein each of the first port and the second port comprises a PCIe interface including a transaction layer, a data link layer, and a physical layer operating in a status of a link according to PCIe standards in response to the respective control of each of the first second link training module and the second link training module.

13. The PCIe device of claim 8, wherein the second port performs the link training operation on the second link in response to a mode change request from the first host to change from the single port mode to the dual port mode.

14. A method of operating a Peripheral Component Interconnect Express (PCIe) device including a first port and a second port, the method comprising:

performing a first link training operation to link up a first host with a first link of the first port;

operating in a single port mode when the first link training operation is completed;

performing a lane reduce operation to reduce a lane corresponding to the first link in response to a mode change request received from the first host; and performing a second link training operation to link up a second host with a second link of the second port when the first link is communicating data between the first port and the first host in a normal operational state in which data and packets are transmitted and received through the first link.

15. The method of claim 14, further comprising operating in a dual port mode in which the first port and the second port operate independently of each other.

16. The method of claim 14, wherein in the performing of the second link training operation, the second link training operation is performed when the first link is communicating data between the first port and the first host in a normal operational state in which data and packets are transmitted and received through the first link.

17. The method of claim 14, wherein the performing of the lane reduce operation comprises changing the status of the first link sequentially to the normal operational state in which data and packets are transmitted and received through the first link, a recovery state, a configuration state, and the normal operational state in which data and packets are transmitted and received through the first link.

18. The method of claim 14, wherein each of the first port and the second port comprises a PCIe interface including a transaction layer, a data link layer and a physical layer operating according to PCIe standards.

19. A method of operating a Peripheral Component Interconnect Express (PCIe) device including a first port and a second port, the method comprising:

performing a first link training operation to link up a first host with a first link of the first port and a second link training operation to link up a second host with a second link of the second port;

operating in a dual port mode, in which the first link and the second link operate independently of each other, when the first link training operation and the second link training operation are completed;

communicating data between the first port and the first host through the first link during the second link training operation;

deactivating the second link in response to a mode change request received from the first host or the second host; and performing a lane increase operation to increase a lane corresponding to the first link when the deactivation of the second link is completed.

20. The method of claim 19, further comprising operating in a single port mode using the first port when the lane increase operation is completed.

21. The method of claim 19, wherein the deactivating of the second link is performed when a status of the first link corresponds to a normal operational state in which data and packets are transmitted and received through the first link.

22. The method of claim 19, wherein the performing of the lane increase operation comprises changing a status of the first link sequentially to a normal operational state in which data and packets are transmitted and received through the first link, a recovery state, a configuration state, and the normal operational state in which data and packets are transmitted and received through the first link.

23. The method of claim 19, wherein each of the first port and the second port comprises a PCIe interface including a transaction layer, a data link layer and a physical layer operating according to PCIe standards.

* * * * *